(12) United States Patent
Wiegman

(10) Patent No.: US 12,145,736 B2
(45) Date of Patent: *Nov. 19, 2024

(54) METHOD AND SYSTEM FOR PROPULSION IN AN ELECTRIC AIRCRAFT

(71) Applicant: BETA AIR LLC, South Burlington, VT (US)

(72) Inventor: Herman Wiegman, Wakefield, RI (US)

(73) Assignee: BETA AIR LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,659

(22) Filed: Apr. 10, 2023

(65) Prior Publication Data

US 2023/0271709 A1 Aug. 31, 2023

Related U.S. Application Data

(63) Continuation of application No. 17/474,794, filed on Sep. 14, 2021, now Pat. No. 11,649,060.

(51) Int. Cl.
| | |
|---|---|
| *B64D 27/24* | (2024.01) |
| *B64C 27/30* | (2006.01) |
| *B64C 29/00* | (2006.01) |
| *B64C 39/02* | (2023.01) |

(52) U.S. Cl.
CPC ............. *B64D 27/24* (2013.01); *B64C 27/30* (2013.01); *B64C 29/0025* (2013.01); *B64C 39/024* (2013.01)

(58) Field of Classification Search
CPC ..... B64D 27/24; B64C 27/30; B64C 29/0025; B64C 39/024; B64C 27/26
See application file for complete search history.

(56) References Cited

U.S. PATENT DOCUMENTS

| | | |
|---|---|---|
| 1,032,859 A | 7/1912 | Pleasants |
| 2,959,373 A | 11/1960 | Zuck |
| 6,376,946 B1 | 4/2002 | Lee |

(Continued)

FOREIGN PATENT DOCUMENTS

| | | |
|---|---|---|
| CA | 2882258 A1 | 2/2014 |
| CN | 109131908 A | 1/2019 |

(Continued)

*Primary Examiner* — Donald J Wallace
*Assistant Examiner* — Jalal C Coduroglu
(74) *Attorney, Agent, or Firm* — Brake Hughes Bellermann LLP

(57) ABSTRACT

A system for stowable propulsion in an electric aircraft that includes at least a propulsor mounted on at least a structural feature that includes at least a rotor and at least a motor mechanically coupled to the at least a rotor, where the motor is configured to cause the rotor to rotate as a function of an activation datum, at least a sensor communicatively coupled to the at least a propulsor configured to detect a position datum as a function of the configuration, generate a clearance datum as a function of the position datum, transmit the clearance datum to a flight controller, and a flight controller communicatively coupled to the at least a propulsor and the at least a sensor configured to receive the clearance datum from the at least a sensor and generate the activation datum as a function of the clearance datum.

20 Claims, 8 Drawing Sheets

(56) References Cited

U.S. PATENT DOCUMENTS

| | | |
|---|---|---|
| 6,575,401 B1 | 6/2003 | Carver |
| 6,664,689 B2 | 12/2003 | Rose |
| 6,799,746 B2 | 10/2004 | Jens |
| 7,410,123 B2 | 8/2008 | Nunnally |
| 8,074,922 B2 | 12/2011 | Bojiuc |
| 8,459,213 B2 | 6/2013 | Moriarty et al. |
| 9,783,288 B1 | 10/2017 | Moore |
| 10,583,912 B2 | 3/2020 | Long |
| 10,860,115 B1 | 12/2020 | Tran |
| 11,181,935 B2 | 11/2021 | Choi et al. |
| 11,649,060 B2* | 5/2023 | Wiegman ............ B64C 29/0025 701/2 |
| 2003/0093187 A1 | 5/2003 | Walker |
| 2003/0217668 A1 | 11/2003 | Fiske |
| 2005/0082421 A1 | 4/2005 | Perlo |
| 2005/0187677 A1 | 8/2005 | Walker |
| 2009/0152391 A1 | 6/2009 | McWhirk |
| 2015/0270760 A1 | 9/2015 | Kreidler |
| 2015/0353206 A1* | 12/2015 | Wang ................. G01C 21/3691 244/114 R |
| 2015/0367935 A1 | 12/2015 | Long |
| 2016/0001879 A1* | 1/2016 | Johannesson ........... B64C 27/50 416/142 |
| 2016/0031555 A1 | 2/2016 | Bevirt |
| 2016/0236790 A1* | 8/2016 | Knapp .................... B64C 11/44 |
| 2017/0274992 A1 | 9/2017 | Chretien |
| 2017/0283048 A1 | 10/2017 | Beckman |
| 2017/0341740 A1 | 11/2017 | Vander Lind |
| 2018/0281931 A1* | 10/2018 | Miller ..................... F01D 15/10 |
| 2018/0364707 A1 | 12/2018 | Bosworth et al. |
| 2019/0033888 A1 | 1/2019 | Bosworth et al. |
| 2019/0152605 A1* | 5/2019 | Tillotson ................ B64D 27/24 |
| 2019/0201046 A1 | 7/2019 | Shelton et al. |
| 2019/0291864 A1 | 9/2019 | Liu et al. |
| 2019/0326842 A1* | 10/2019 | Omekanda ................ H02K 7/20 |
| 2019/0356257 A1* | 11/2019 | Gopalakrishnan ........................... H02P 25/0805 |
| 2020/0028396 A1* | 1/2020 | Valentini ................... H02K 1/20 |
| 2020/0031478 A1* | 1/2020 | Clark ........................ B64C 3/32 |
| 2020/0081405 A1* | 3/2020 | Skertic ..................... G05B 7/02 |
| 2020/0082731 A1 | 3/2020 | Choi et al. |
| 2020/0108918 A1* | 4/2020 | Douglas .................... B64C 9/00 |
| 2020/0262541 A1* | 8/2020 | Jiang .................. G06K 19/0728 |
| 2020/0307390 A1 | 10/2020 | Clark et al. |
| 2021/0031940 A1 | 2/2021 | Guida |
| 2021/0070179 A1 | 3/2021 | Wiegman |
| 2021/0070457 A1* | 3/2021 | Wiegman ............... B64D 27/24 |
| 2021/0089055 A1 | 3/2021 | Tran |
| 2021/0089134 A1 | 3/2021 | Tran |
| 2021/0093333 A1 | 4/2021 | Chappuis et al. |
| 2021/0229825 A1* | 7/2021 | Eppink ................. B64D 27/24 |
| 2021/0380261 A1 | 12/2021 | Clark et al. |
| 2022/0009644 A1* | 1/2022 | Rabbi .................... B64D 27/24 |
| 2022/0204153 A1* | 6/2022 | Griffin .................... B64D 9/003 |
| 2022/0388633 A1* | 12/2022 | Page ....................... B64C 39/10 |
| 2023/0017339 A1* | 1/2023 | Hibbs ..................... H02P 6/182 |

FOREIGN PATENT DOCUMENTS

| | | |
|---|---|---|
| CN | 109270522 A | 1/2019 |
| CN | 109308076 A | 2/2019 |
| CN | 109528157 A | 3/2019 |
| EP | 0726564 A1 | 8/1996 |
| EP | 3797714 A1 | 3/2021 |
| EP | 3797715 A1 | 3/2021 |
| EP | 3892209 A1 | 10/2021 |
| ES | 2369129 | 11/2011 |
| GB | 2583396 A | 10/2020 |
| JP | 2019055769 A | 4/2019 |
| RU | 2562474 C1 | 9/2015 |
| RU | 2721808 C1 | 5/2020 |
| WO | 2015198200 A1 | 12/2015 |
| WO | 2017197316 A1 | 11/2017 |
| WO | 2021022236 A1 | 2/2021 |
| WO | 2021034793 A1 | 2/2021 |
| WO | 2021118925 A1 | 6/2021 |

* cited by examiner

METHOD AND SYSTEM FOR PROPULSION IN AN ELECTRIC AIRCRAFT

CROSS-REFERENCE TO RELATED APPLICATIONS

This application is a continuation of Non-provisional application Ser. No. 17/474,794, filed on Sep. 14, 2021, and entitled "METHOD AND SYSTEM FOR PROPULSION IN AN ELECTRIC AIRCRAFT," the entirety of which is incorporated herein by reference.

FIELD OF THE INVENTION

The present invention generally relates to the field of electric aircraft. In particular, the present invention is directed to systems, methods, and assembly for propulsion in an electric aircraft.

BACKGROUND

In an electric aircraft, such as an eVTOL, some of the propulsors may be stowed when aircraft is not in use or during flight to reduce air resistance. In situations where software limitations are not ideal, it is useful to have a mechanism that can stop the rotation of a propulsor, such as when unauthorized access is detected, or user may have been able to bypass software limitations on the operation of the electric aircraft, which may create a situation where a user continues to increase the aircraft's altitude above the electric aircraft's physical limits. It is desirable to be able to prevent an electric aircraft from initiating the propulsor while rotors are stowed while also preventing unauthorized use, or use beyond set limits, through a hardware mechanism.

SUMMARY OF THE DISCLOSURE

In an aspect, a system for propulsion in an electric aircraft is disclosed. The system includes at least a propulsor mounted on at least a structural feature that includes at least a rotor and at least a motor mechanically coupled to the at least a rotor. The system includes at least a sensor communicatively coupled to the at least a propulsor configured to detect a position datum associated with at position of the at least a propulsor. The system includes a controller communicatively coupled to the at least a propulsor and the at least a sensor, wherein the controller is configured instruct the clamp to selectively lock the at least a propulsor as a function of the position datum.

In another aspect, method for propulsion in an electric aircraft is disclosed. The method includes detecting, by at least a sensor, a position datum associated with a position of at least a propulsor. The method includes selectively locking, using a clamp, the at least a propulsor from rotating. The method includes instructing, using at least a controller, the clamp to selectively lock the at least a propulsor as a function of the position datum, wherein the at least a controller is communicatively coupled to the at least a propulsor and the at least a sensor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems, methods and assembly for stowable propulsion in an electric aircraft. In an embodiment, a system that includes at least a propulsor, which includes at least a rotor and a motor, at least a chamber configured to include at least a propulsor and to move relative to the propulsor between a first configuration, which may be a stowed position, and a second configuration, which enables flight, at least a sensor configured to detect that propulsor is in the second position and a flight controller that generates an activation datum based on the clearance datum transmitted by the sensor when propulsor is in a second configuration. In an embodiment, system may further include a magnetic clamp coupled to the motor and in communication with sensor and flight controller.

Aspects of the present disclosure can be used to ensure vehicle only initiates in the correct position. Aspects of the present disclosure can also be used to prevent initiation of flight or temporarily stop rotation of rotor when unauthorized access is detected or propulsor is being used outside set limitations. This is so, at least in part, because a magnetic clamp is coupled to the motor and may be triggers by a flight controller, such as after receiving a command from a remote device, that will send a magnetic signal into the motor that will stop rotation of the rotor.

Aspects of the present disclosure allow for a reverse use of the magnetic clamp where rotor will only rotate when magnetic clamp is engaged. Exemplary embodiments illustrating aspects of the present disclosure are described below in the context of several specific examples.

Figure 1:
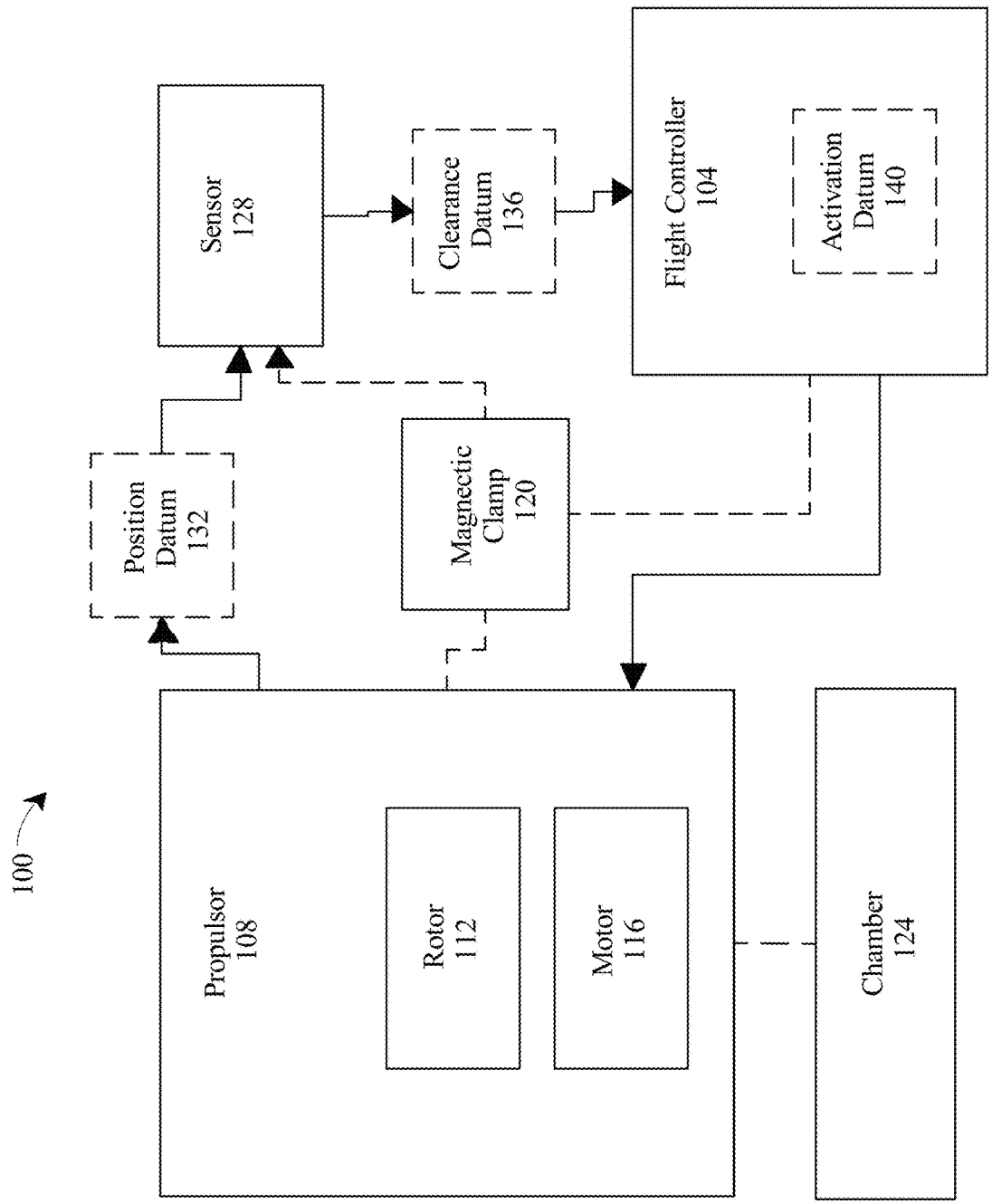
FIG. 1 is an exemplary block diagram for a system for stowable propulsion in an electric aircraft.

Referring now to FIG. 1, an exemplary embodiment of a system 100 for stowable propulsion in an electric aircraft is illustrated. System 100 includes a flight controller 104. Flight controller 104 may include any computing device as described in this disclosure, including without limitation a microcontroller, microprocessor, digital signal processor (DSP) and/or system on a chip (SoC) as described in this disclosure. Flight controller 104 may include, be included in, and/or communicate with a mobile device such as a mobile telephone or smartphone. Flight controller 104 may include a single computing device operating independently, or may include two or more computing device operating in concert, in parallel, sequentially or the like; two or more computing devices may be included together in a single computing device or in two or more computing devices. Flight controller 104 may interface or communicate with one or more additional devices as described below in further detail via a network interface device. Network interface device may be utilized for connecting flight controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 104 may include but is not limited to, for example, a computing device or cluster of computing devices in a first location and a second computing device or cluster of computing devices in a second location. Flight controller 104 may include one or more computing devices dedicated to data storage, security, distribution of traffic for load balancing, and the like. Flight controller 104 may distribute one or more computing tasks as described below across a plurality of computing devices of computing device, which may operate in parallel, in series, redundantly, or in any other manner used for distribution of tasks or memory between computing devices. Flight controller 104 may be implemented using a "shared nothing" architecture in which data is cached at the worker, in an embodiment, this may enable scalability of system 100 and/or computing device.

With continued reference to FIG. 1, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

At a high level, aspects of the present disclosure are directed to embodiments of a system 100 for propulsion assembly in an electric airplane. System for stowable propulsion assembly may be integrated into vehicles, airplanes, or any other machinery configured for flight. The systems disclosed herein utilize stowable rotors to provide additional thrust in situations requiring additional thrust, such as take-off, landing, hovering, or high-turbulence situations, while avoiding drag from the stowable rotors where not needed. In one embodiment, a structural feature includes a mounted propulsor including a rotor and a motor mechanically coupled to the rotor allowing the rotor to rotate when in an activated mode. The mounted propulsor includes a chamber configured to support a first configuration where the propulsor and the rotor are stowed and heated in an enclosed environment, and a second configuration where the rotor is deployed. Here and as will be appreciated after reading this disclosure in its entirety by a person of ordinary skill in the art, is a system configured to integrate with a vehicle that supports lift and thrust supplied by rotors or any other type of machinery configured for flight. The rotors may be applied at any point in time during any of the flight phases.

Still referring to FIG. 1, system 100 includes at least a propulsor 108 mounted on at least a structural feature. At least a structural feature may be any portion of a vehicle incorporating system 100, including any vehicle as described below. At least a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, structural feature may be constructed from additively manufactured polymer material with a carbon fiber exterior; aluminum parts or other elements may be enclosed for structural strength, or for purposes of supporting, for instance, vibration, torque or shear stresses imposed by at least a propulsor 108. Persons skilled in the art, upon reviewing the entirety of this disclosure, will be aware of various materials, combinations of materials, and/or constructions techniques. "Propulsor", as used herein, is a component or device used to propel a craft by exerting force on a fluid medium, which may include a gaseous medium such as air or a liquid medium such as water. At least a propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contra-rotating propellers, a moving or flapping wing, or the like. At least a thrust element may include without limitation a marine propeller or screw, an impeller, a turbine, a pump-jet, a paddle or paddle-based device, or the like. Persons skilled in the art, upon reviewing the entirety of this disclosure, will be aware of various devices that may be used as at least a thrust element.

Still referring to FIG. 1, propulsor 108 includes at least a rotor 112. At least a rotor 112, as used herein, may include one or more blade or wing elements driven in a rotary motion to drive fluid medium in a direction axial to the rotation of the blade or wing element. At least a rotor 112 may include a plurality of blade or wing elements. At least a rotor 112 may include a mast or shaft coupled to the one or more blade or wing elements; mast or shaft may be driven by a motor as described in further detail below.

Continuing to refer to FIG. 1, at least a propulsor 108 may include at least a motor 116 mechanically coupled to the at least a rotor 112 to cause the rotor to rotate when activated. In an embodiment, motor 116 may be mechanically coupled to a magnetic clamp 120. "Magnetic clamp," for the purpose of this disclosure, refers to a mechanism that prevents the rotor from rotating through magnetic force. In one embodiment, magnetic clamp may prevent the rotor from rotating by sending a magnetic wave the rotor. In embodiments, the motor 116 is configured to only rotate rotor 112 when magnetic force from the magnetic clamp 120 is present, such that when magnetic clamp 120 is inactive the rotor 112 will not rotate. In an embodiment, magnetic clamp is mechanically coupled to a stator within the motor 116. At least a motor 116 may include without limitation, any electric motor, where an electric motor is a device that converts electrical energy into mechanical energy, for instance by causing a shaft to rotate. At least a motor 116 may be driven by direct current (DC) electric power; for instance, at least a motor 116 may include a brushed DC at least a motor 116 or the like. At least a motor 116 may be driven by electric power having varying or reversing voltage levels, such as alternating current (AC) power as produced by an alternating current generator and/or inverter, or otherwise varying power, such as produced by a switching power source. At least a motor 116 may include, without limitation, brushless DC electric motors, permanent magnet synchronous at least a motor 116, switched reluctance motors, or induction motors. In addition to inverter and/or switching power source, a circuit driving at least a motor 116 may include electronic speed controllers (not shown) or other components for regulating motor speed, rotation direction, and/or dynamic braking. Persons skilled in the art, upon reviewing the entirety of this disclosure, will be aware of various devices and/or components that may be used as or included in a at least a motor 116 or a circuit operating a at least a motor 116, as used and described herein.

Still referring to FIG. 1, system 100 may include at least an energy source. At least an energy source may include any device providing energy to at least a propulsor 108. In an embodiment, at least an energy source provides electric energy to the at least a propulsor 108. At least an energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a capacitor, an inductor, and/or a battery. Battery may include, without limitation a battery using nickel-based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, or any other suitable battery. Persons skilled in the art, upon reviewing the entirety of this disclosure, will be aware of various devices of components that may be used as at least an energy source. System 100 may include multiple propulsion sub-systems, each of which may have a separate energy source powering a separate at least a propulsor 108.

Continuing to refer to FIG. 1, system 100 includes at least a chamber 124 configured to retain the at least a propulsor 108. At least a chamber 124 may be formed to admit at least a rotor 112 as described further below. At least a chamber 124 may be attached to at least a structural feature; attachment may be accomplished by any feasible means, including without limitation attachment with fasteners such as screws, rivets, or bolts, attachment by adhesion, attachment by welding, or the like. At least a chamber 124 may be incorporated in at least a structural feature; for instance, at least a chamber 124 may include a pouch or cavity in at least a structural feature. In one embodiment, at least a chamber 124 may be integrated directly into a main body frame of the vehicle incorporating system 100 and manifested via an aperture configured to be enclosed in order to retain heat within the at least a chamber 124. At least a chamber 124 and the at least a propulsor 108 may be configured to move relative to one another between a first configuration in which the at least a rotor 112 is stowed within the at least a chamber 124 and a second configuration in which the at least a rotor 112 is deployed outside of the at least a chamber 124. In an embodiment, at least a propulsor 108 may include a retraction mechanism that retracts the at least a rotor 112 into the at least a chamber 124 to place the at least a rotor 112 and the at least a chamber 124 in the first configuration (as shown for instance in FIG. 2A), and extends the at least a rotor 112 out of the at least a chamber 124 to place the at least a rotor 112 and the at least a chamber 124 in the second configuration.

Continuing to refer to FIG. 1, the retraction mechanism to retract the at least a rotor 112 may be an electric retraction mechanism configured to be controlled by a person operating system 100, a remote device and/or the flight controller 104. The electric retraction mechanism may include one or more sensors configured to detect environmental features associated with the at least a propulsor 108, the at least a rotor 112, and the at least a chamber 124. For example, the electric retraction mechanism may include an environmental sensor configured to temperature, air quality, carbon monoxide, or any other gas or particulate matter in air. In an embodiment, at least a motor 116 is mounted on a retraction mechanism; alternatively, rotor may be mounted on a retraction mechanism, and, for instance, moved into engagement with a gear mechanically coupling at least a rotor 112 to at least a motor 116 in second configuration. The retraction mechanism may be powered by any motor as described above; the retraction mechanism may include a linear actuator, which may be pneumatically or hydraulically activated.

Still referring to FIG. 1 at least a chamber 124 may include at least an enclosing panel configured to completely or partially enclose the interior space of at least a chamber 124. At least an enclosing panel may be configured to move between a closed position enclosing the interior space of the chamber and an opened position opening the chamber and exposing the interior space. In an embodiment, the at least an enclosing panel may be configured to support a partially closed configuration for releasing excess heat or any undesired matter unintentionally stowed in the at least a chamber 124. As used herein, at least a chamber 124 is closed where air in the chamber is physically and/or thermally isolated from air outside the at least a chamber 124; where the at least a chamber 124 is closed, at least a chamber 124 may be airtight, or may be sufficiently enclosed to prevent significant losses of heat due to convection, in a manner analogous to a car cabin or house with doors and windows closed. At least a chamber 124 may be open when not in a closed state. In an embodiment, at least an enclosing panel may function to close at least a chamber 124 when at least a rotor 112 is retracted, where at least a rotor 112 is on a retraction mechanism as illustrated further below. At least an enclosing panel is configured to move, retract, slide, or perform any other applicable movement in order to place the at least a chamber 124 and the at least a rotor 112 in the first configuration when the at least an enclosing panel is in the closed position and to place the at least a chamber 124 and at least a rotor 112 in the second configuration when the at least an enclosing panel is in the open position; in an embodiment, at least a rotor 112 may not be mounted on a retraction mechanism, so that motion of at least an enclosing panel is the sole motion required to move at least a rotor 112 and at least a chamber 124 between first configuration and second configuration. In an embodiment, at least an enclosing panel may be flat, curved, or any other applicable shape, and be made up of any suitable material or combination of materials, including without limitation metal such as aluminum, titanium, steel, or the like, polymer materials or composites, fiberglass, carbon fiber, wood, or any other suitable material. In an embodiment, in the first configuration, the at least an enclosing panel is configured to be extended from a portion above the at least a rotor 112 until the interior space of at least a chamber 124 is enclosed. In the second configuration, the at least an enclosing panel may be stowed in a cavity or pocket included in the at least a structural element or any other component of system 100. The cavity or pocket is configured to retain the at least an enclosing panel and a coupled electric motor or other applicable power source configured to support transitions of the at least an enclosing panel from first configuration to second configuration, and second configuration to first configuration. As a non-limiting example, at least an enclosing panel may be constructed from additively manufactured polymer material with a carbon fiber exterior; aluminum parts or other elements that support a combination of agility and strength, or for purposes of supporting, for instance, vibration, torque or shear stresses imposed by flight turbulence.

Still referring to FIG. 1. In an embodiment, at least an enclosing panel may comprise a sliding mechanism, hinging mechanism, retraction mechanism, or any other applicable mechanism configured to be coupled to the electric motor within system 100 in order to allow a user or computing device associated with system 100 to control the movement of at least an enclosing panel. For example, a user of system 100 or a computing device may switch between first configuration, in which the at least an enclosing panel emerges out of the cavity or pocket and extends over or across the at least a chamber 124 until it is fully enclosed, and second configuration, in which the at least an enclosing panel retracts back into the cavity or pocket fully exposing the at least a chamber 124.

Still referring to FIG. 1. In embodiments, at least an enclosing panel may include a rotor cover configured to cover at least a rotor 112 and enclose the at least a rotor 112 to place the at least a rotor 112 and the at least a chamber 124 in the first configuration when in the closed state, and remove or retract in order to expose the at least a rotor 112 to place the at least a rotor 112 and the at least a chamber 124 in the second position when in the open state. At least a chamber 124 may include at least a first chamber section that remains stationary relative to at least a propulsor 108. The rotor cover may rotate, slide, or move linearly to expose or cover at least a rotor 112. As a non-limiting example at least a chamber 124 may partially house at least a propulsor 108 while, at an enclosing panel may displace vertically as to expose at least a rotor 112. Vertical displacement may be accomplished using any means suitable for retraction mechanism as described above, including a pneumatic or hydraulic actuator or other motorized device. Vertical displacement may free rotor 112 to rotate between at least a rotor 112 cover and a section of the at least a chamber 124.

Still referring to FIG. 1. In some embodiments system 100 may include at least a nacelle cover that covers an otherwise exposed portion of at least a chamber 124 when at least a chamber 124 and at least a propulsor 108 are in the second configuration. At least a nacelle cover may be a structure presenting an aerodynamically formed surface redirecting downdraft from at least a propulsor 108 around a portion of at least a chamber 124. At least a nacelle cover may be formed of any material or materials suitable for formation of at least a structural element 108. At least a nacelle cover may include an opening through which a shaft supporting at least a rotor 112 and/or a portion of at least a propulsor 108 may pass. Opening may be partially or wholly sealed; opening may permit passage of air for convection purposes from one side to another of at least a nacelle cover for the purposes of cooling at least a chamber 124. Opening may be substantially sealed, and magnetic clamp may be on a rotor side of at least a nacelle cover. At least a nacelle cover may include a part of at least an enclosing panel. For instance, at least a moveable part may reclose under at least a rotor 112. Persons skilled in the art, upon reviewing the entirety of this disclosure, will be aware of various forms at least a nacelle cover may take to perform consistently with the description herein. At least a nacelle cover may redirect downdrafts as well as updrafts or any other passage of air around or at chamber 124, in any configuration as described herein.

Still referring to FIG. 1, systems 100 includes at least a sensor 128 communicatively coupled to the at least a propulsor 108, where the at least a sensor 128 is configured to detect a position datum 132 as a function of the configuration. "Position datum" refers to a data, or an electric signal, that indicates whether propulsor is in a first configuration, where the at least a rotor 112 is stowed within the at least a chamber 124, or whether it is in a second configuration, where the at least a rotor 112 is deployed outside of the at least a chamber 124. In an embodiment, at least a motor 116 may include or be connected to at least a sensor 128 configured to detect one or more conditions of at least a motor 116. One or more conditions may include, without limitation, voltage levels, electromotive force, current levels, temperature, current speed of rotation, and the like. At least a sensor 128 may be configured to communicate a current status of at least a motor 116 to a flight controller 104. In a nonlimiting example, at least a sensor 128 may be configured to detect whether the at least a rotor 112 is stowed within the at least a chamber 124.

Additionally, or alternatively, and still referring to FIG. 1. In embodiments, at least a sensor 128 is further configured to detect whether magnetic clamp 120 is triggered.

Continuing to refer to FIG. 1, at least a sensor 128 is configured to generate a clearance datum 136 as a function of the position datum 132. "Clearance datum" refers to data, or a signal, that indicates that at least a propulsor 108 is in a position to initiate flight. In an embodiment, clearance datum may include a signal from at least a magnetic clamp 120 indicating that it is in a position that allows rotors 112 to rotate. In a nonlimiting example, at least a sensor 128 may only generate a clearance datum when it detects that propulsor is in the second configuration, where the at least a rotor 112 is deployed outside of the at least a chamber 124. In an embodiment, at least a sensor 128 is further configured to generate a clearance datum 136 as a function of the magnetic clamp 120. In a nonlimiting example, at least a sensor 128 may only generate a clearance datum 136 when position datum 132 indicates that propulsor 108 is in the second configuration, and magnetic clamps 120 is not engaged.

With continued reference to FIG. 1, at least a sensor 128 is configured to transmit the clearance datum 136 to a flight controller 104. In a nonlimiting example, at least a sensor 128 may transmit an electrical signal indicating that both propulsors 108 and magnetic clamps 120 are in a position that allows flight to be initiated.

Continuing to refer to FIG. 1, flight controller 104 is configured to receive the clearance datum 136 from the at least a sensor 128. In a nonlimiting example, clearance datum 136 may be an electrical signal that the flight controller 104 is configured to listen to.

Still referring to FIG. 1, flight controller 104 is configured to generate activation datum 140 as a function of clearance datum 136. "Activation datum" refers to a signal, such as an electrical signal, that activates at least a propulsor 108. In a nonlimiting example, flight controller 104 may generate an activation datum 140 when it receives a clearance datum 136 indicating at least a propulsor 108 is in a second configuration.

Additionally, or alternatively, and still referring to FIG. 1. In an embodiment, flight controller 104 may be configured to trigger the magnetic clamp 120. In an embodiment, flight controller 104 may be further configured to trigger the magnetic clamp 120 as a function of a remote device. In an embodiment, flight controller 104 may be configured to trigger the magnetic clamp as a function of a machine learning process. In an embodiment, flight controller 104 may be configured to trigger the magnetic clamp as a function of a flight plan. "Flight plan" for the purpose of this disclosure, refers to the optimum set of maneuvers, or commands, to be performed by the electric aircraft in order to reach a set objective. Flight plan may include flight limitations such as restricted zones and maximum flight altitude. Flight plan may be consistent with disclosure of flight plan in U.S. patent application Ser. No. 17/365,512 and titled "PILOT-CONTROLLED POSITION GUIDANCE FOR VTOL AIRCRAFT", which is incorporated herein by reference in its entirety.

Figure 2:
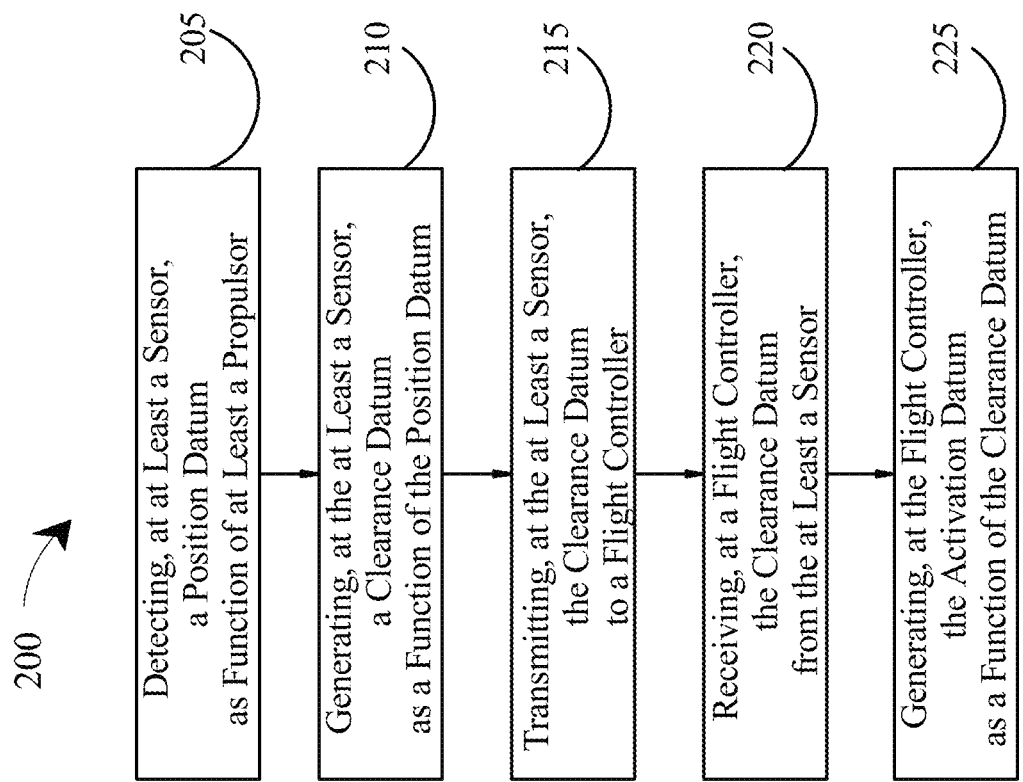
FIG. 2 is an illustrative flow diagram for a method for stowable propulsion in an electric aircraft.

Now referring to FIG. 2, an exemplary embodiment of a method 200 for stowable propulsion in an electric aircraft is illustrated. At step 205, method 200 includes detecting, at least a sensor 128, position datum 132 as a function of at least a propulsor 108. In an embodiment, method 200 may further comprise utilizing magnetic clamp 120. In an embodiment, method 200 is configured to detect whether magnetic clamp is triggered. In a nonlimiting example, at least a sensor 128 may detect whether propulsor is in a first configuration or second configuration. In another nonlimiting example, at least a sensor 128 may be configured to detect whether propulsor 108 is in a first configuration or second configuration, and whether magnetic clamp 120 is engaged or disengaged.

Still referring to FIG. 2, method 200, at step 210, includes generating, at least a sensor 128, clearance datum 136 as a function of position datum 132. In a nonlimiting example, at least a sensor 128 may generate a clearance datum 136 when it detects that propulsor 108 is in a second configuration. In another nonlimiting example, at least a sensor 128 may only generate a clearance datum when propulsor is in a second configuration and magnetic clamp is disengaged. "Engaged" and "disengaged", for the purpose of this disclosure, refers to whether magnetic clamp has been triggered to lock or unlock by the flight controller 104. In an embodiment, engaged means that magnetic clamp 120 is locked. In other embodiments, engaged means that magnetic clamp 120 is unlocked. Locked and unlocked magnetic clamp 120 is illustrated further below.

Continuing to refer to FIG. 2, method 200, at step 215, includes transmitting, at least a sensor 128, clearance datum 136 to flight controller 104. In embodiments, method 200 further includes generating, at least a sensor 128, a clearance datum 136 as a function of the magnetic clamp 120. In a nonlimiting example, at least a sensor 128 may only generate a clearance datum once it detects that propulsor is in a second configuration, in which the at least a rotor 112 is deployed outside of at least a chamber 124.

With continued reference to FIG. 2, at step 220, method 200 includes receiving, at flight controller 104, clearance datum 136 for at least a sensor 128. In a nonlimiting example, clearance datum 136 may be transmitted through a wired connection. In a nonlimiting example, clearance datum 136 may be a binary signal, where the presence of a signal indicates that at least a propulsor 108 is in a second configuration.

Still referring to FIG. 2, at step 225, method 200 includes generating, at flight controller 104, activation datum 140 as a function of clearance datum 136. In a nonlimiting example, flight controller 104 generates activation datum 140 which causes propulsor to initiate operation. In an embodiment, flight controller 104 may trigger a magnetic clamp 120 during operation, which may cause propulsor to deactivate while magnetic clamp 120 is engaged. In a nonlimiting example, when user continues to climb above a set altitude threshold, flight controller 104 may engage the magnetic clamp 120, which will cause the vertical propulsor to stop rotating until altitude is within set threshold. In an embodiment, system 100 may further include a manual disengagement mechanism for the magnetic clamp. In a nonlimiting example, a user may disengage the magnetic clamp manually in a circumstance where flight controller 104 fails to disengage the magnetic clamp.

Additionally, or alternatively, and still referring to FIG. 2. In an embodiment, method 200 may further include triggering, at flight controller 104, magnetic clamp 120 as a function of a machine learning process. In embodiments, method 200 may further include triggering, at flight controller 104, the magnetic clamp 120 as a function of a remote device. In embodiments, method 200 further includes changing from a first configuration of propulsors to a second configuration of propulsors as a function of a remote device. In an embodiment, 200 further includes changing from a second configuration of propulsors to a firth configuration of propulsors 108 as a function of a remote device. In a nonlimiting example, a fleet operator, through a device such as a laptop, may change propulsors 108 to stowed positions and/or engage magnetic clamp 120.

Figure 3A:
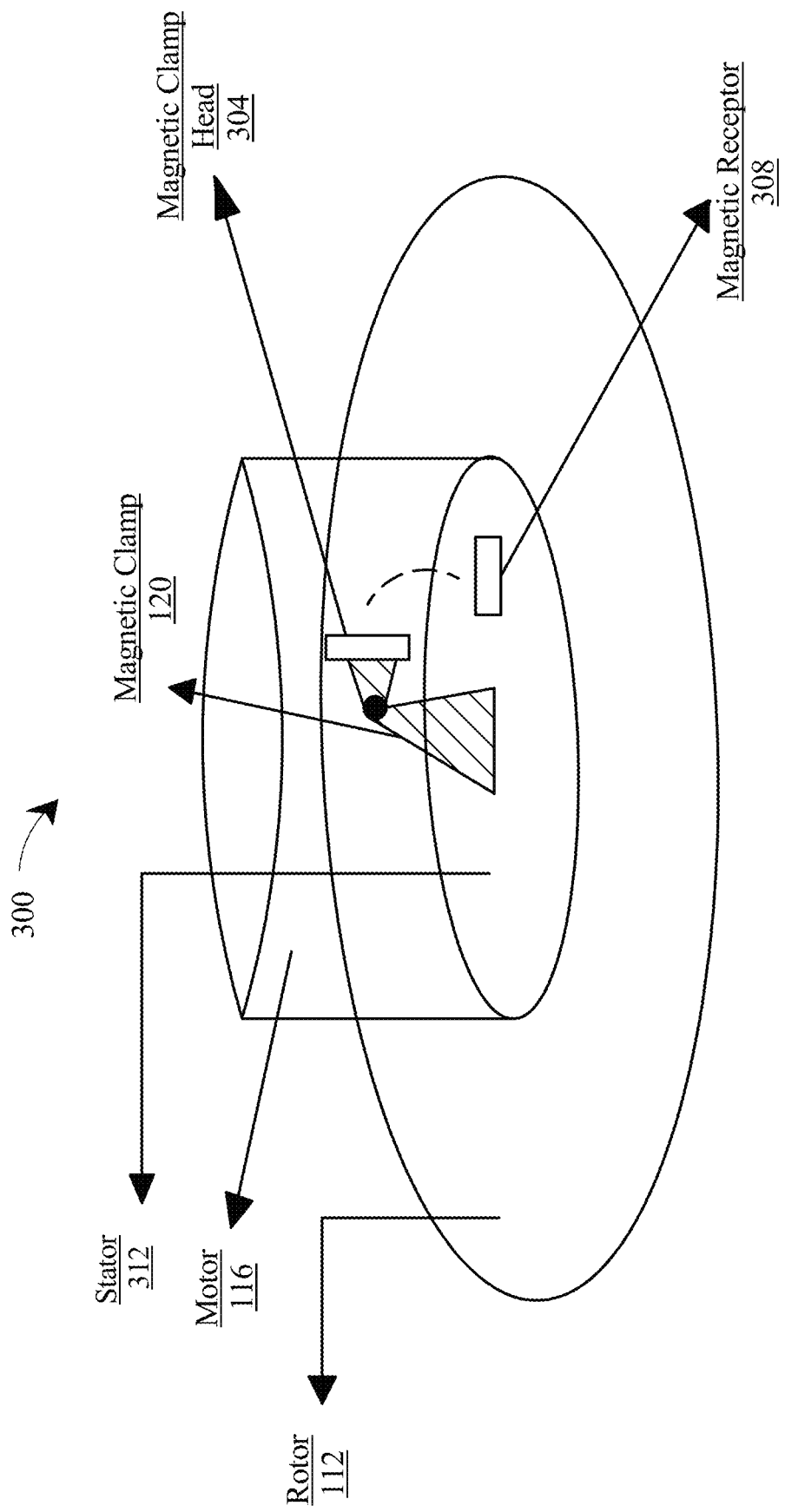
FIG. 3A is an illustrative representation of a magnetic clamp in a locked position.
Figure 3B:
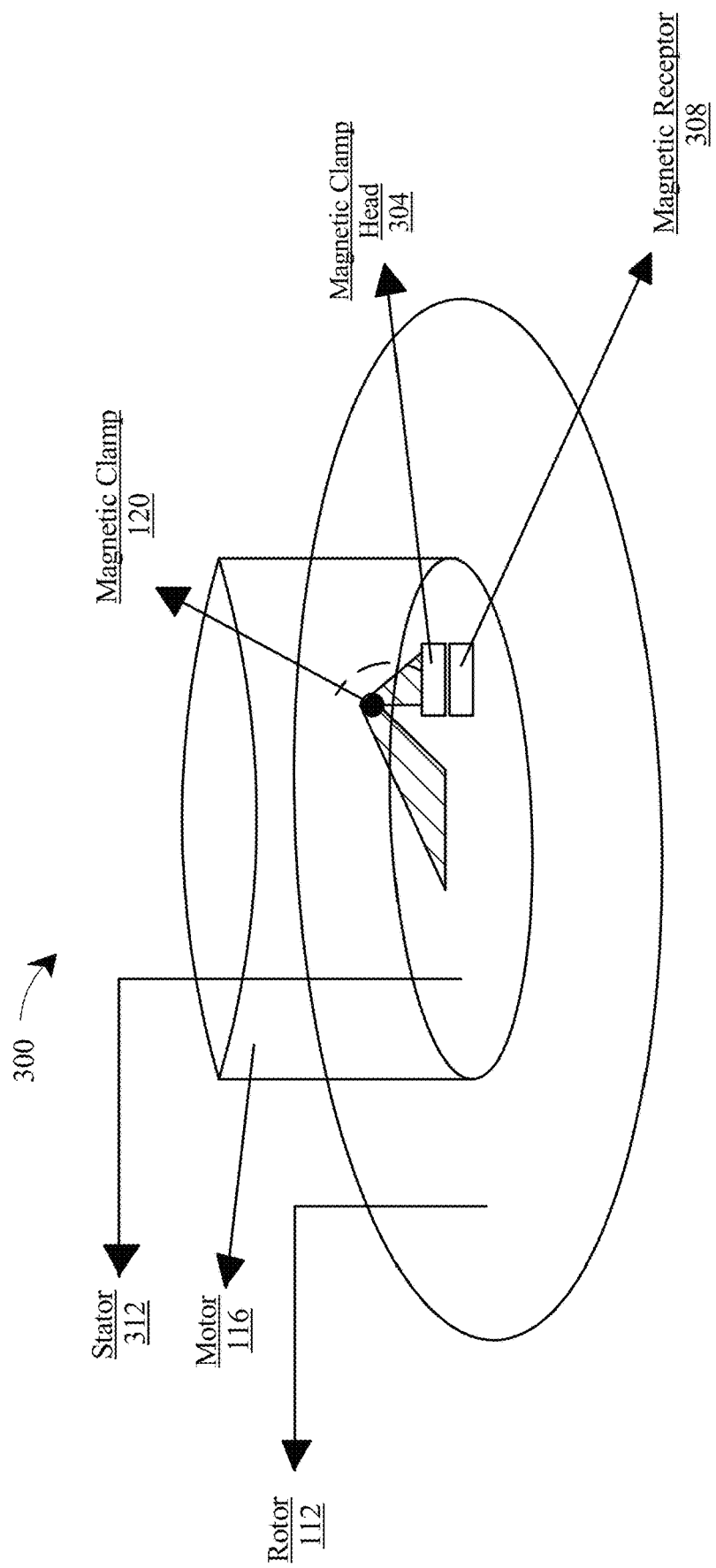
FIG. 3B is an exemplary representation of a magnetic clamp in an unlocked position.

Now referring to FIGS. 3A-B, exemplary representations of a magnetic clamp 120 in an unlocked and locked positions are illustrated. In an embodiment, magnetic clamp 120 is nested inside the motor 116, where magnetic clamp 120 includes a magnetic clamp head 304 that is configured to stay decoupled from a magnetic receptor 308, and coupled when magnetic clamp 120 is triggered. In an embodiment, magnetic receptor 308 may be coupled to a stator 312 inside the motor 116. Referring to FIG. 3A, a magnetic clamp 120 is shown in an unlocked position. In a nonlimiting example, stator 312 will activate rotor 112 as a function of the motor 116 and will continue to rotate the rotor 112 for as long as there is a signal from the motor 116 and magnetic receptor 308 is not coupled to magnetic clamp head 304. In a further embodiment, motor 116 may only generate signal to the stator 312 as a function of the activation datum 140, generated by the flight controller 104. In an embodiment, stator 312 will only rotate the rotor 112 if magnetic clamp head 304 and magnetic receptor are coupled.

Now referring to FIG. 3B, a magnetic clamp 120 is shown in a locked position. In an embodiment, stator 312 may only rotate the rotor 112 when magnetic clamp head 304 is coupled with magnetic receptor 308. In an embodiment, stator may be configured to not rotate the rotor 112 when magnetic clamp head 304 and magnetic receptor 308. In an embodiment, at least a sensor 128 may be configured to generate a signal as a function of the magnetic clamp 120. In an embodiment, at least a sensor 128 may generate a clearance datum 136 as function of the position datum 132 detected from the propulsor and a datum detected from the magnetic clamp 120. In a nonlimiting example, flight controller 104 may only activate the at least a propulsor, through the activation datum 140, when propulsor and magnetic clamp are in the correct position to initiate flight.

Still referring to FIGS. 3A-B, in an embodiment, magnetic clamp 120 may be triggered when an aircraft is flying forward as to prevent rotors from rotating. In an embodiment, magnetic clamp 120 may be triggered by the flight controller 104. In another embodiment, flight controller may trigger the magnetic clamp as a function of a flight plan. In a nonlimiting example, flight plan may specify a maximum altitude where magnetic clamps 120 may be activated after a user continuously goes over the set altitude limit. In an embodiment, flight controller 104 may be configured to trigger the magnetic clamp 120 as a function of a remote device. In a nonlimiting example, a remote device may be a controlled by a fleet operator, where magnetic clamp may be activated to prevent an aircraft from reaching unsafe altitudes. In embodiments, flight controller 104 may be configured to trigger the magnetic clamps 120 as a function of a machine learning process. Machine learning process may be trained with data from previous activations of the magnetic clamp for the electric aircraft, or from other aircrafts, such as when part of a fleet. Machine learning process may be further trained with training data that includes previous activation of magnetic clamp 120 that were based on a flight plan. Machine learning process may be trained with data related to how many times a user had violated a maximum altitude limit before magnetic clamp 120 was activated. Machine learning model is described in detail further below.

Additionally, or alternatively, magnetic clamp may be used in a plurality of vehicles that utilizes a propulsor 108. In embodiments, magnetic clamp 120 may be used as a theft deterrent in a land vehicle or watercraft. In a nonlimiting example, magnetic clamp 120 may be triggered in an electric boat when theft of the watercraft has been detected. Magnetic clamp 120, in embodiments, may be triggered when unauthorized access to electric vehicle has been detected. In a nonlimiting example, magnetic clamp 120 may activate and prevent a eVTOL from initiating flight, if unauthorized access is detected, by preventing rotors from rotating.

Figure 4:
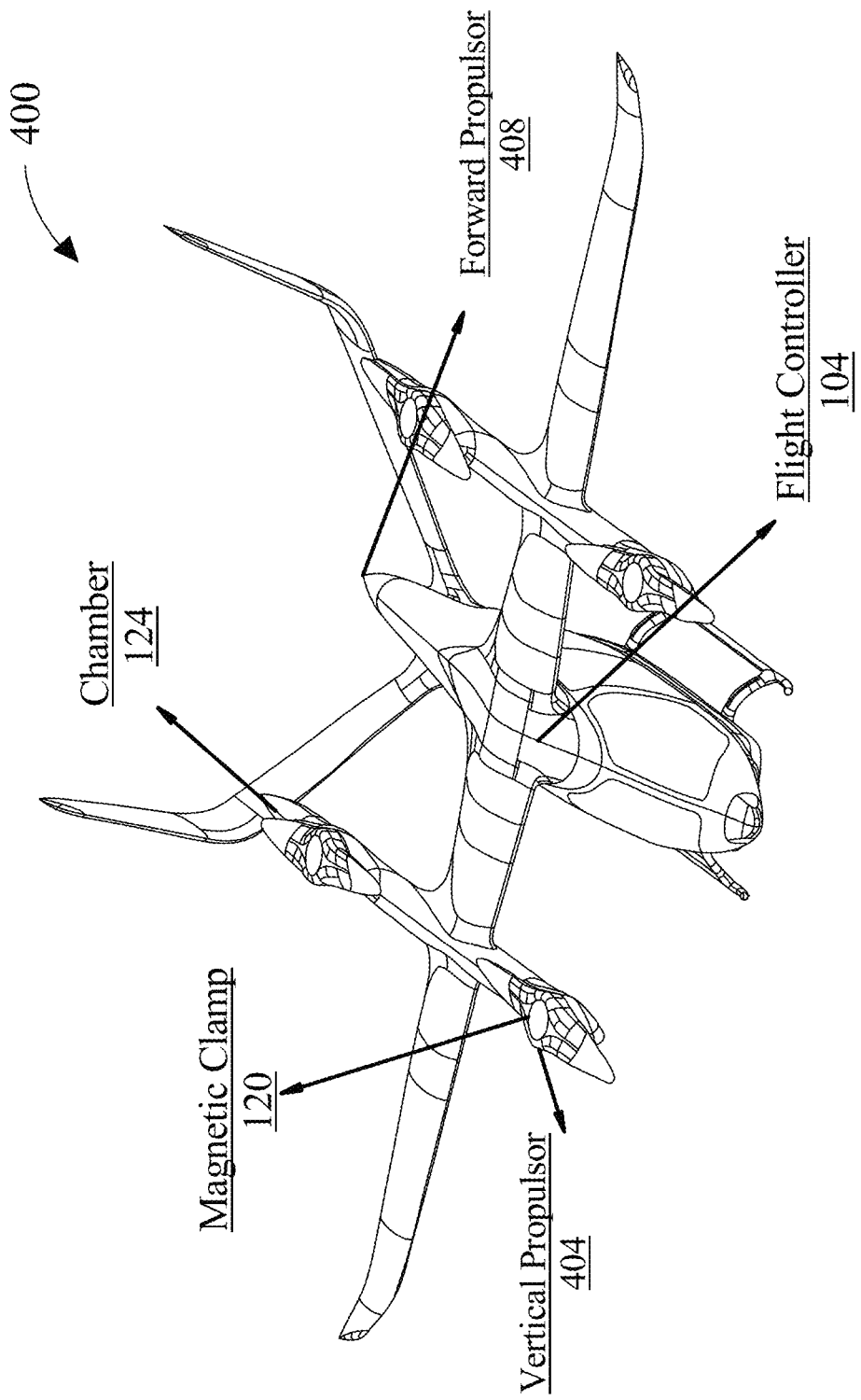
FIG. 4 is an exemplary embodiment of an electric aircraft.

Referring now to FIG. 4, an embodiment of an electric aircraft 400 is presented. Still referring to FIG. 4, electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on an electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of an electric aircraft 400, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 400 and/or propulsors. In embodiments, electric aircraft 400 may include a vertical propulsor 404. In an embodiment, electric aircraft 400 may include a forward propulsor. In an embodiment, electric aircraft 400 may include a magnetic clamp 120. In an exemplary embodiment, vertical propulsors 404 may be stowed during forward flight. In an embodiment, vertical propulsors 404 may be locked by a magnetic clamp while in forward flight. In a nonlimiting example, flight controller 104 may prevent a vertical propulsor 404 from rotating, through activating the magnetic clamp 120, while electric aircraft is flying forward. In an embodiment, magnetic clamp 120 may be triggered on a forward propulsor 408. In a nonlimiting example, magnetic clamp 120 may be triggered on a forward propulsor 408 when a user continues to fly into a restricted area, as to limit the aircraft mobility while still allowing aircraft to hover.

Figure 5:
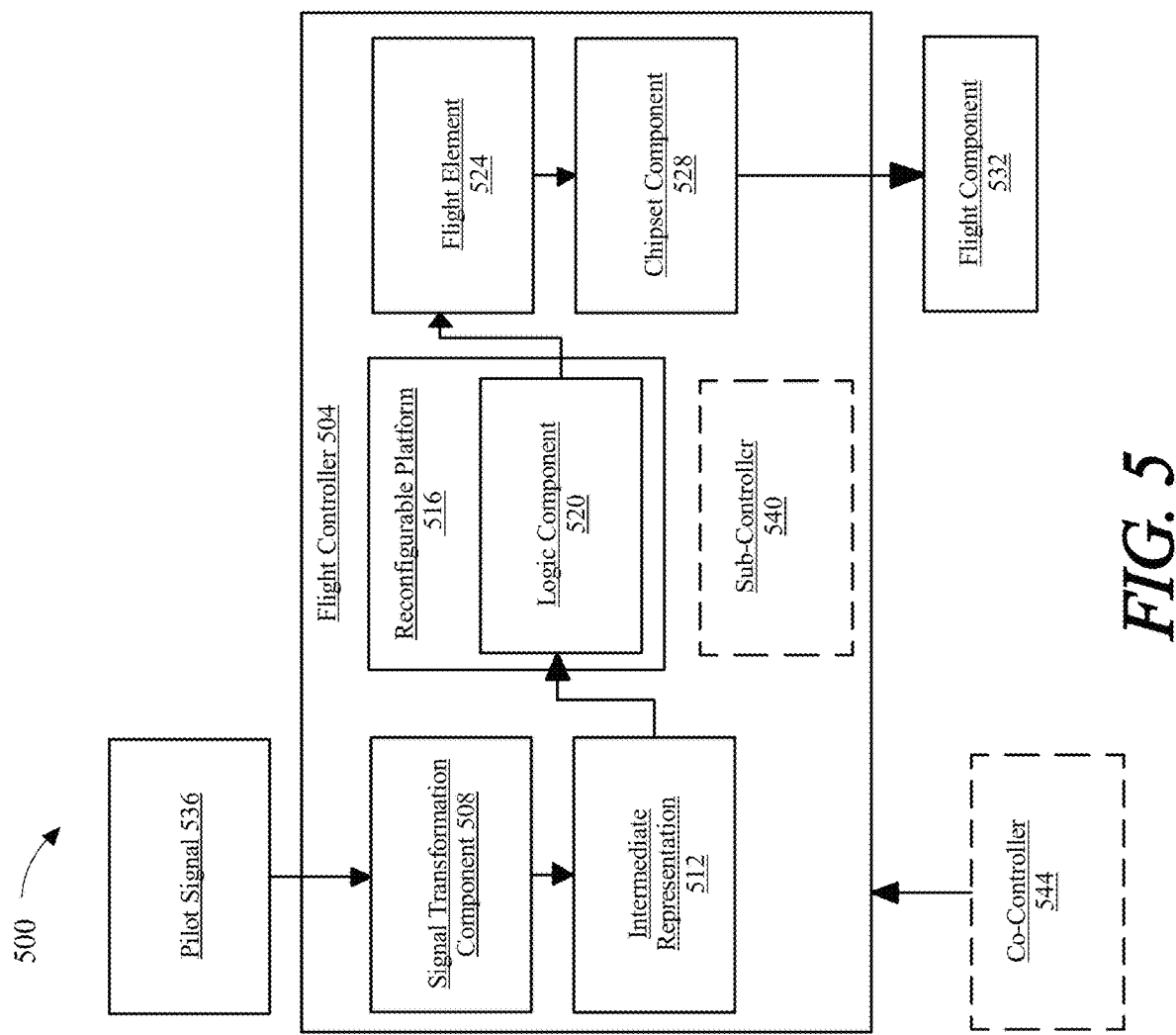
FIG. 5 is an illustrative representation of a flight controller.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

Still referring to FIG. 5. In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example.

Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component 532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured to generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example, and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
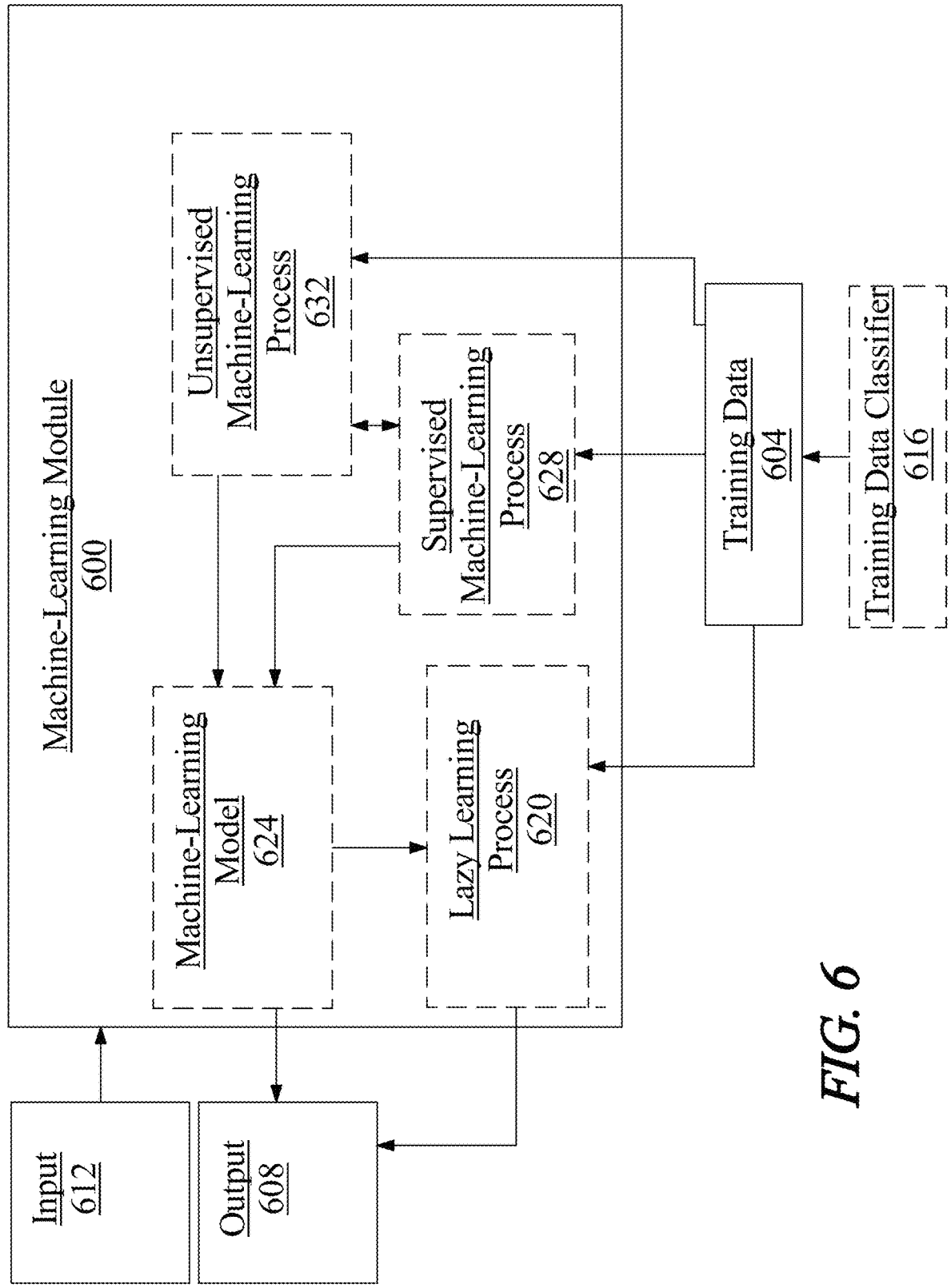
FIG. 6 is an exemplary diagram of a machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
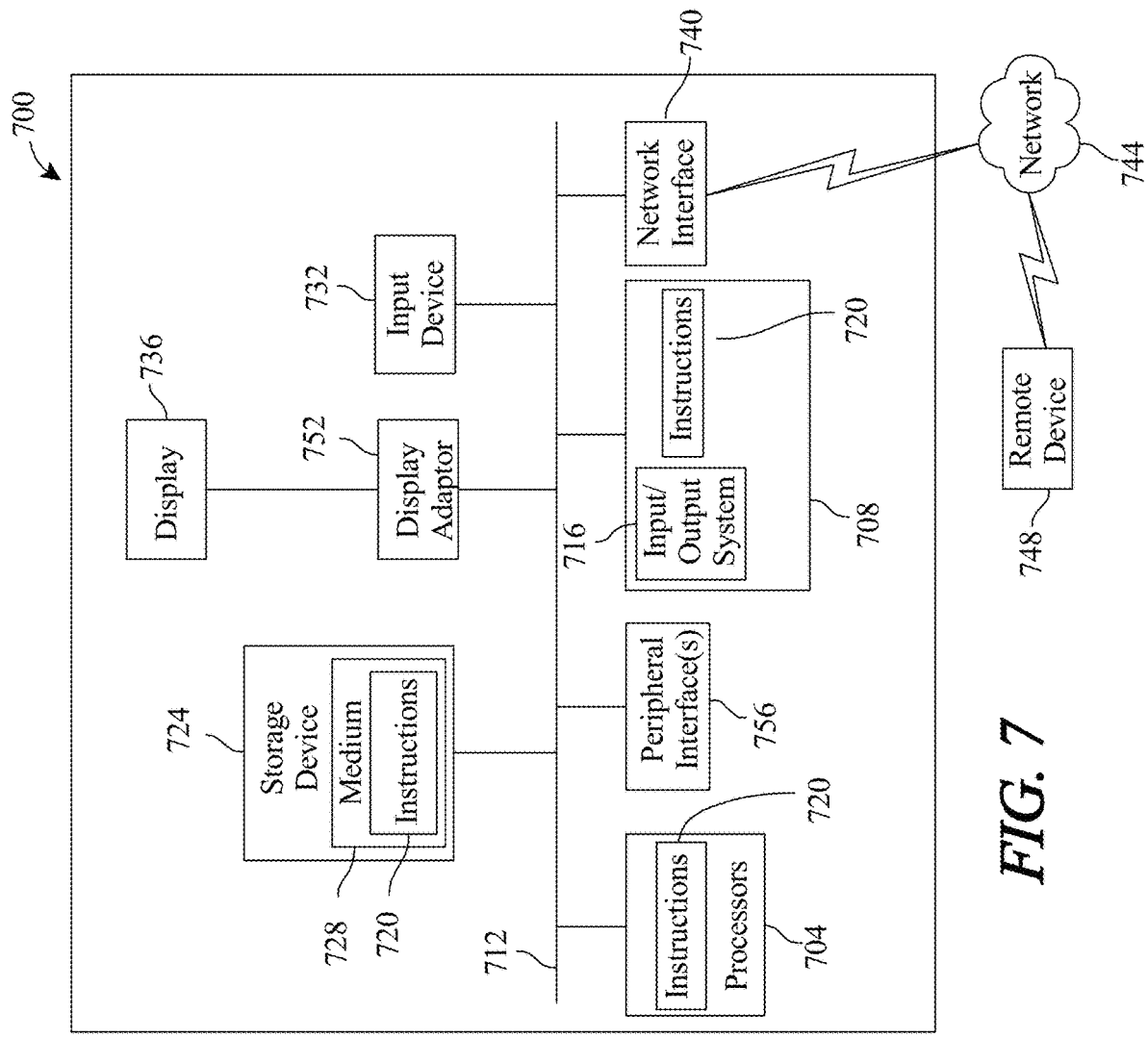
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for propulsion in an electric aircraft, the system comprising:
   a propulsor mounted on at least a structural feature, wherein the propulsor comprises:
   a rotor, and
   a motor mechanically coupled to the rotor;
   a sensor communicatively coupled to the propulsor, wherein the sensor is configured to detect a position datum associated with a position of the propulsor;
   a clamp configured to selectively lock the propulsor from rotating; and
   a controller communicatively coupled to the propulsor and the sensor, wherein the controller is configured instruct the clamp to selectively lock the propulsor as a function of the position datum.

2. The system of claim 1, wherein the clamp comprises a magnetic clamp.

3. The system of claim 1, wherein the clamp uses magnetic force to brake a shaft of the propulsor.

4. The system of claim 1, wherein the position datum is generated as a function of a condition of the motor.

5. The system of claim 4, wherein the condition of the motor comprises a current associated with the motor.

6. The system of claim 1, wherein the motor comprises an electric motor.

7. The system of claim 1, wherein the sensor is further configured to identify the position of the clamp.

8. The system of claim 1, wherein the clamp further comprises:
   a magnetic receptor configured to be mechanically coupled to the propulsor;
   and a clamp head configured to be selectively coupled to the magnetic receptor.

9. The system of claim 1, wherein the clamp is configured to be triggered as a function of a flight plan.

10. The system of claim 1, wherein the clamp is configured to be triggered as a function of a remote device.

11. A method for propulsion in an electric aircraft, the method comprising:
    detecting, by a sensor, a position datum associated with a position of a propulsor, wherein the propulsor comprises:
    a rotor, and
    a motor mechanically coupled to the rotor; and
    selectively locking, using a clamp, the propulsor from rotating based on an instruction from a controller, the instruction being determined as a function of the position datum, wherein the controller is communicatively coupled to the propulsor and the sensor.

12. The method of claim 11, wherein the clamp comprises a magnetic clamp.

13. The method of claim 11, wherein the clamp uses magnetic force to brake a shaft of the propulsor.

14. The method of claim 11, wherein the position datum is generated as a function of a condition of the motor.

15. The method of claim 14, wherein the condition of the motor comprises a current associated with the motor.

16. The method of claim 11, wherein the motor comprises an electric motor.

17. The method of claim 11, wherein the method further comprises identifying, using the sensor, the position of the clamp.

18. The method of claim 11, wherein the clamp comprises:
   a magnetic receptor configured to be mechanically coupled to the propulsor; and
   clamp head configured to be selectively coupled to the magnetic receptor.

19. The method of claim 11, wherein the method additionally comprises triggering, using the controller, the clamp as a function of a flight plan.

20. The method of claim 11, wherein the method additionally comprises engaging, using a remote device, the clamp.

* * * * *